Oct. 13, 1925.
A. D. GRIFFIN
TIRE CHAIN FASTENER CLAMP
Filed Jan. 30, 1925
1,557,495
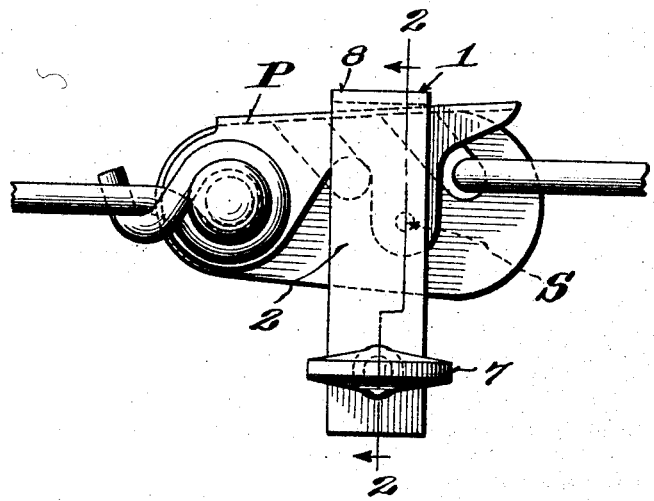
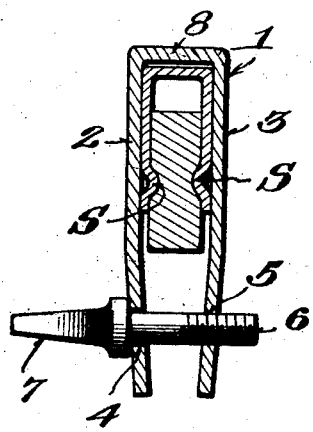 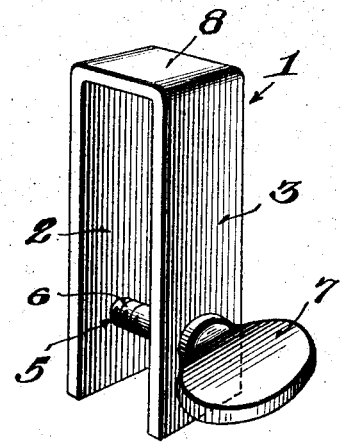
Inventor
Albert D. Griffin
By A. W. Freeman,
Attorney Patented Oct. 13, 1925.

1,557,495

UNITED STATES PATENT OFFICE.

ALBERT D. GRIFFIN, OF PLANKINTON, SOUTH DAKOTA.

TIRE-CHAIN-FASTENER CLAMP.

Application filed January 30, 1925. Serial No. 5,820.

*To all whom it may concern:*

Be it known that I, ALBERT D. GRIFFIN, a citizen of the United States, residing at Plankinton, in the county of Aurora and State of South Dakota, have invented certain new and useful Improvements in Tire-Chain-Fastener Clamps, of which the following is a specification.

This invention relates to certain new and useful improvements in tire chain fastener clamps, and the primary object thereof is to provide a fastener clamp which is of simplified form, which can be economically produced and which serves to effectively secure the pivoted member of the fastener against accidental movement to open position by exerting inward pressure against each of the sides of the pivoted member, thereby to prevent disengagement of the projections of the latter from its sockets.

In the drawings:—

Fig. 1 is a side elevation showing the invention applied to a fastener:

Fig. 2 is a section on line 2—2 of Fig. 1, and

Fig. 3 is a detail perspective view of the invention.

In proceeding in accordance with the present invention a clamp 1 of integral U-shaped form is employed which is made of spring steel and with its arms 2 and 3 normally tending to separate or relatively move apart when the arms are relatively compressed. The arms 2 and 3 are of such width so as to afford effective bearings engaging opposite sides of the pivoted member P of the chain fastener. The arms 2 and 3 engage over the struck-out projections S of member P which projections engage in sockets provided therefor in the body of the fastener. Alined perforations 4 and 5 are formed in the free ends of the arms of which 5 is threaded to engage the threads of a screw 6 having a winged head 7. The back or closed end 8 of the clamp is formed to seat on one side edge of the fastener, while the screw 6 extends transversely across the opposite side of the fastener. When the clamp is in operative position as depicted in the drawings, the tendency of the arms 2 and 3 is to spring apart, thus holding the screw under tension so as to prevent accidental disengagement thereof. However, should the screw become loose so as to destroy its clamping action, the closed end of the clamp and the screw will prevent movement of the pivoted member of the fastener to an extent to allow the latter from becoming disengaged from the chain.

As shown in Fig. 2, the arms 4 and 5 upon tightening of the screw relatively converge so as to increase the holding action of the clamp.

What is claimed is:—

A clamp for tire chain fasteners having a pivoted latch member, composed of a U-shaped integral clamp formed to have its closed end seat on the pivoted member and having registering apertures in the free ends of its arms, one of the apertures being threaded, and a winged screw extending through the other aperture and having its outer end threaded through the threaded aperture and extending transversely across the bottom of the fastener, whereby to draw the free ends of the arms together in inclined points beyond the bottom of the fastener upon tightening of the screw, said arms engaging over the latches of the fastener so as to clamp same in operative position.

In testimony whereof I affix my signature.

ALBERT D. GRIFFIN.